(12) United States Patent  
Huang

(10) Patent No.: US 6,701,409 B2
(45) Date of Patent: Mar. 2, 2004

(54) METHOD OF READING DATA ON A DISK DRIVE

(75) Inventor: Sin-Ru Huang, Taipei (TW)

(73) Assignee: Via Technologies, Inc., Taipei (TW)

( * ) Notice: Subject to any disclaimer, the term of this patent is extended or adjusted under 35 U.S.C. 154(b) by 101 days.

(21) Appl. No.: 09/854,296

(22) Filed: May 11, 2001

(65) Prior Publication Data

US 2001/0054132 A1 Dec. 20, 2001

(30) Foreign Application Priority Data

May 31, 2000 (TW) .......................... 89110550 A

(51) Int. Cl.⁷ .............................................. G06F 12/00
(52) U.S. Cl. ........................... 711/113; 711/112; 710/52
(58) Field of Search ................... 711/112, 113; 710/52

(56) References Cited

PUBLICATIONS

Jan Smith, "Jan's Illustrated Computer Literacy 101, Chapter 6 Storage Disk Format" Nov. 3, 2002, pg 1–4.*
Accurite "Travel HD PC Card Interfaced Hard Drive" http://www.accurite.com/TravelHD.html.*
SMSC "Windows CE Development Platform Using the SMSC SLC90E66 (Victory 66), Application note 9.0 " http://www.smsc.com/main/anpdf/an90.pdf.*
Smith, "Disk Cache—Miss Ratio Analysis and Design Considerations", ACM Trans on Computer Systems, Vol 3, No 3, Aug. 1985 pp. 161–203.*
Diamond Point, "JUMPtec Windows CE Solution Pack" http://www.dpie.com/dimmpc/dimmwince.html.*

* cited by examiner

*Primary Examiner*—Mano Padmanabhan
*Assistant Examiner*—Paul A Baker
(74) *Attorney, Agent, or Firm*—Rabin & Berdo, P.C.

(57) ABSTRACT

A method of reading data on a disk drive suited to an operating system that does not support the disk drive. First, the system allocates a free memory space in a memory thereof. Then the system reads the data in all the sectors of the disk with a reading routine, and saves the data in the free memory space. While receiving a disk drive reading command, the system processes the data saved in the free memory space according to the disk drive reading command. Thus, the drawback of the repeatedly turning on and off the disk drive is avoided while reading data with a length larger than a sector.

13 Claims, 2 Drawing Sheets

METHOD OF READING DATA ON A DISK DRIVE

BACKGROUND OF THE INVENTION

1. Field of the Invention

The present invention relates to a technique and method of processing a peripheral device. More particularly, the present invention relates to a data reading process for a disk drive and aims at the problem of the computer with an operating system that does not support disk drives. With the present invention, the drawback in the prior art that only a single sector is read can be avoided.

2. Description of the Related Art

Generally, an operating system (OS) is needed in a computer system for the starting operation of the computer and the driving services of all peripheral devices thereof. An example of Microsoft Windows OS series that is widely used, such as Windows NT, basically takes the disk drive as one of the standard peripherals of the computer system, and provides the driver for driving and accessing data of the disk drive. Therefore, the disk drive peripheral devices, such as hard disk drives or floppy disk drives, can be correctly used by calling proper routines through the application program interface (API). However, some well-known OS do not support the mechanical reading process of the disk drive. For example, the Windows CE OS, which is another product of Microsoft Windows OS series, is mainly used in the notepad computer, such as the personal digital agent (PDA), the handheld PC (HPC), and so on, instead of the ordinary desktop or notebook computer. Such an OS does not take the disk drive as one of the standard apparatus, and the disk drive is not supported therein. As a result, with such an OS, problems occur in the data reading process of a disk drive.

FIG. 1 is a flow chart showing the data reading process of a disk drive in the prior art, such as Windows CE OS. The parameters used therein are hereinafter described. The parameter TotalLength indicates the total length of data to be read from a disk drive. The parameter cbData indicates the length of data in each reading step. The parameter SectorSize indicates the length of a sector in the disk drive. The parameter ReadLength indicates the length of data that has been read and processed from the sector in current process. And, the parameter CurrentLength indicates the length of data that has been read and processed at present. All the parameters above indicate the length of data, and the same unit of measurement such as a byte can be introduced thereto. For example, the parameter SectorSize indicates the length of a single sector in bytes, such as 512 bytes in an ordinary sector. The parameter cbData indicates the length of data in bytes in each reading step, such as 32 bytes in length, which is usually smaller than the length of a single sector. And, the parameter TotalLength indicates the total length of data to be read in bytes, such as 2000 bytes.

Referred to FIG. 1, the OS first sets the parameters ReadLength and CurrentLength 0 (step S1), wherein the parameter ReadLength indicates length of data in a single sector while the parameter CurrentLength indicates length of data in all the sectors. A sector is then read from the disk drive with a reading subroutine (step S2). Notice that the prior art reads only a sector in each reading step. Then, in the previous read sector, data is processed in accordance with the length defined in the parameter cbData, and the parameters ReadLength and CurrentLength are both added by the parameter cbData (step S3). Then, the OS compares the parameter CurrentLength with the total length of data defined in the parameter TotalLength (step S4). If CurrentLength is not larger than TotalLength, the OS compares the parameter ReadLength with the length of a sector defined in the parameter SectorSize (step S5). If ReadLength is not larger than the SectorSize, the procedure flows back to step S3 to process the rest of the data of the previous read sector. On the other hand, if the parameter ReadLength is larger than the length of a sector, the parameter ReadLength is reset by subtracting the value of SectorSize from the former value of ReadLength (step S6), and the procedure flows back to step S2 for reading the next sector. The steps above are repeatedly executed until the parameter CurrentLength is larger than the total data length parameter TotalLength in step S4.

According to the above description, the system in the prior art reads only a sector in each reading step for the disk drive. However, in the practical reading operation, usually the total data is larger than a sector. As a result, in order to read all the sectors in sequence, the systems in the prior art must repeatedly turn on and off the disk drive intermittently. Such a method of reading data on a disk drive has many drawbacks. First, the operation time is wasted through repeatedly turning on and off the disk drive, thus the system performance is degraded. Furthermore, the repeatedly restarting of the driving motor of the disk drive causes harsh noise, electricity consumption to be increased, and the lifetime of the disk drive to be reduced.

Therefore, it is the main object of the present invention to provide a technique and a method for reading data on disk drives, especially for the OS that does not support the disk drive. The present invention does not repeatedly turn on and off the disk drive while reading thereof, so as to solve the problem in the prior art that only a single sector is read in a reading step.

SUMMARY OF THE INVENTION

According to the object above, the present invention discloses a method for reading data on a disk drive suited to a computer that does not support the disk drive hardware, such as the Microsoft Windows CE OS. First, the system allocates a free memory space in the computer memory. Then, the system reads data in a plurality of sectors of the disk drive and saves the data to the free memory space with a reading routine. While receiving a disk drive reading command, the system reads and processes the data of the disk drive saved in the free memory space in accordance with the disk drive reading command. Thus, the drawback of repeatedly turning on and off the disk drive is avoided while reading data with a length larger than a sector.

In addition, the present invention disclosed another method of reading data on a disk drive. Similarly, the system allocates a free memory space in the computer memory. Then, the system reads data in a plurality of sectors of the disk drive and saves the data to the free memory space with a reading routine. While receiving a disk drive reading command, the system sequentially reads and processes the data in response to a data processing length parameter in the data of the disk drive saved in the free memory space in accordance with the disk drive reading command and the data processing length parameter. A length corresponding to the data processing length parameter is smaller than a sector.

In the above method of the present invention, the disk drive may be a floppy disk drive with a floppy disk therein, or may be a hard disk drive. In addition, in the reading step, all the sector data in the floppy disk may be read and saved in the free memory space, wherein the length of the free memory space is larger than all sector data recorded in the floppy disk. Furthermore, the method can be used before the booting operation. The data may comprise booting parameters, and the operating system can be, for example, Windows CE OS. In order to save all the data of a floppy disk therein, the length of said free memory space is preferably in the range of 1 million to 2 millions bytes corresponding to the storage space of a common floppy disk.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

The present invention discloses a method to solve the problem in the prior art. This invention reads all the data of a disk drive to the unused memory space in the system in a step, instead of reading a sector in each reading step. Thus increase the speed of data reading, and avoid repeatedly turning on and off the disk drive motor. The following description of the present invention is mainly focused on a floppy disk drive, wherein data is saved on a floppy disk therein. To those skilled in the art, however, the present invention can be applied in any other form of the disk drive, such as hard disk drives.

Figure 1:
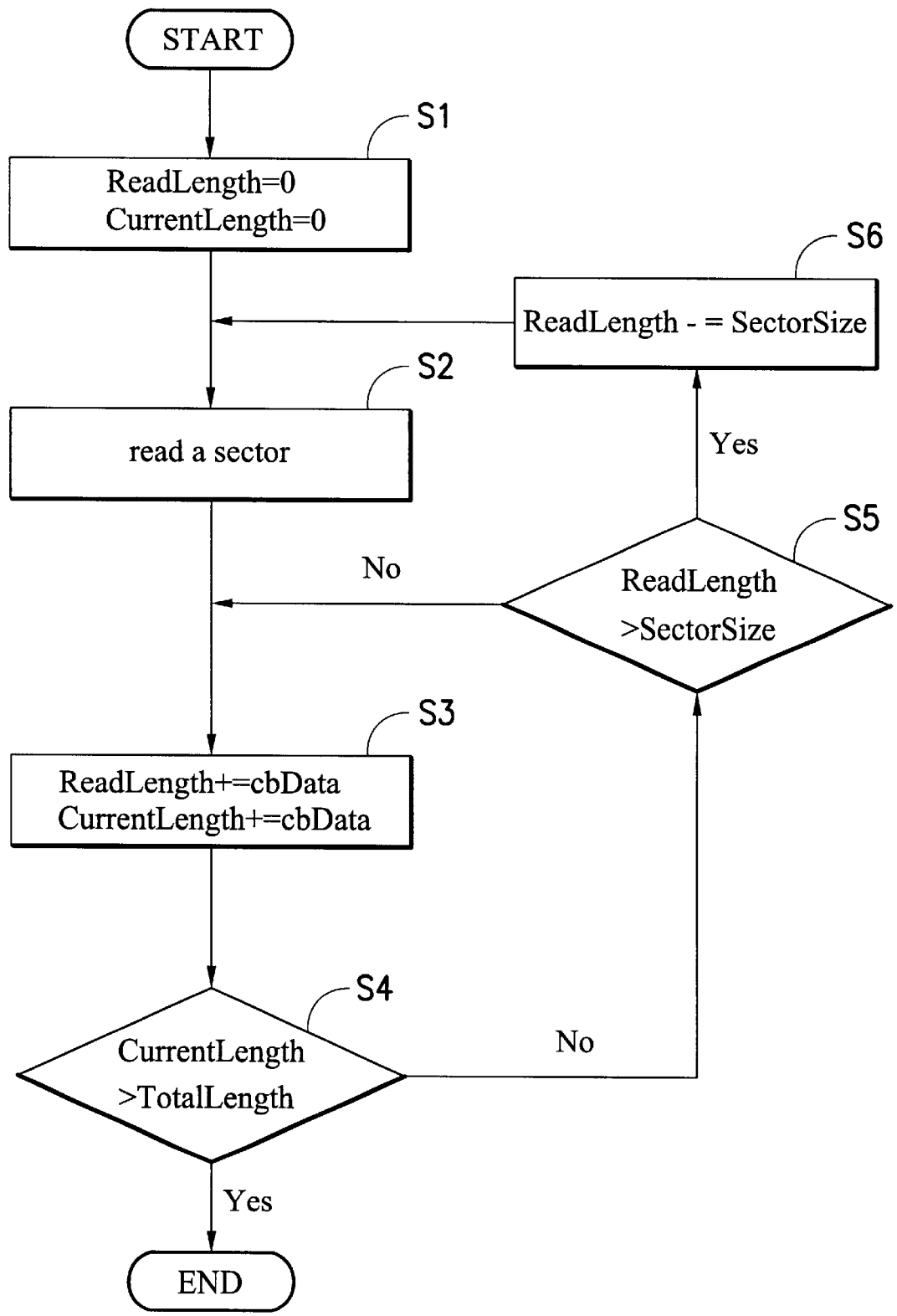
FIG. 1 (Prior Art) is a flow chart showing the data reading process of a disk drive in the prior art of Windows CE operating system.
Figure 2:
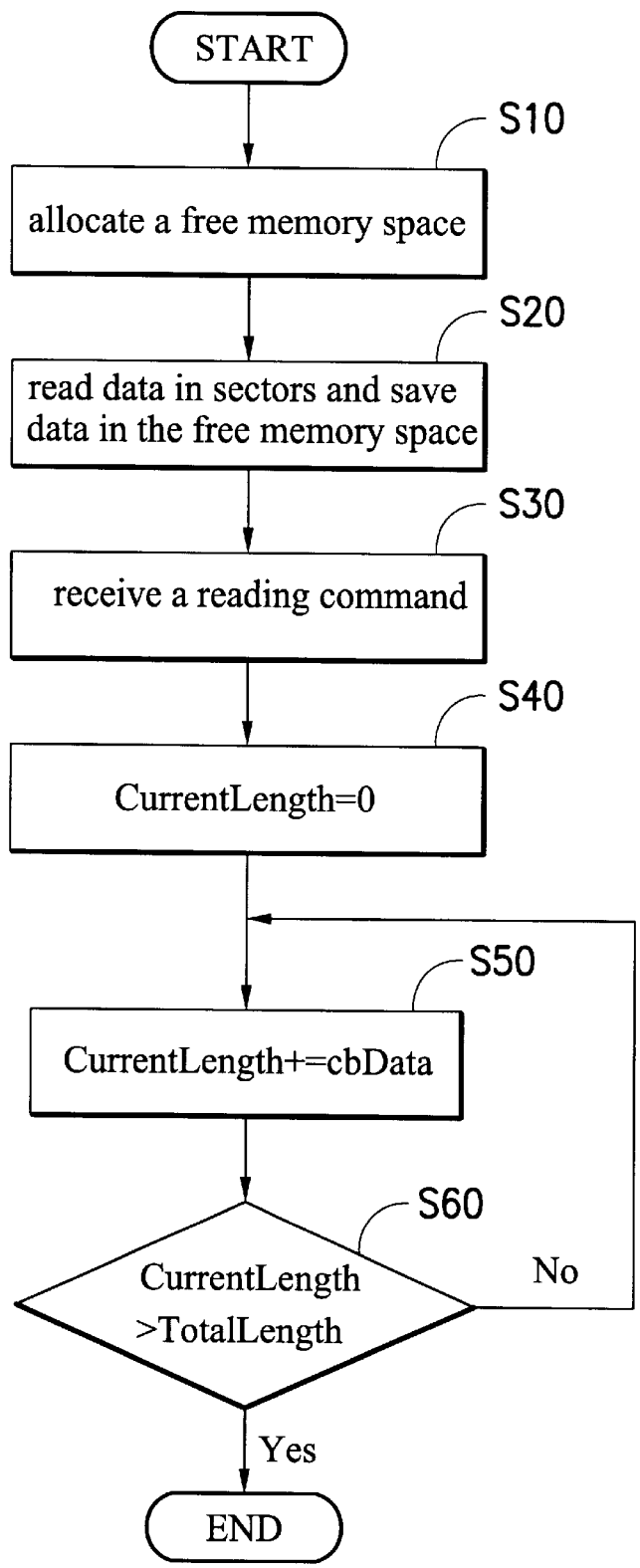
FIG. 2 is a flow chart showing the data reading process of a disk drive as an embodiment of the present invention.

FIG. 2 is a flow chart of the data reading process of a disk drive according to an embodiment of the invention, wherein the process is suited to the floppy disk reading operation before the booting process is completed, as well as suited to the common disk reading operation. First, the system allocates a free memory space in the computer memory (step S10). For example, before booting the Windows CE OS, the memory in the range of memory address 1 MB to 2 MB is unused and can be the free memory space. While data in all sectors is to be read in a step, the length of the free memory space should be larger than all sector data recorded on the floppy disk. Then the system reads data in a plurality of sectors of the floppy disk by a reading routine, and saves the data in the free memory space described above (step S20). In this step, data in a plurality of sectors in the floppy disk is read in a step; for example, the reading routine can read data in all sectors of the floppy disk in a step while the length of the free memory space is large enough. The sector reading step in the present invention differs from the reading step in the prior art, because the embodiment of the present invention needs not where the data is on the disk while reading; instead, the data is saved directly in the free memory space. As a result, the operation is not limited to reading a single sector in a step; therefore, the problem that the disk drive motor repeatedly turns on and off is avoided.

Next, the practical disk drive reading command is received (step 30). The execution of the disk drive reading command is on the free memory space saving the sector data instead of the original disk drive. The system first sets the parameter CurrentLength 0 (step 40), wherein the parameter CurrentLength indicates different meaning with that in the prior art. Since data in all the sectors has been read, the parameter CurrentLength in the present embodiment indicates the length of data in bytes that is in current process. Then, the system continues processing the subsequent data in next cbData bytes, adds the parameter CurrentLength with cbData (step S50), and compares the parameter CurrentLength with the parameter TotalLength (step S60) that indicates the total length of data. If CurrentLength is not larger than TotalLength, the procedure flows back to step S50 for processing the subsequent data in next cbData bytes. On the other hand, if CurrentLength is larger, the system has finished processing all the data. In the above steps S50 and S60, the system processes the data in a length of cbData bytes, and the parameter cbData is commonly smaller than the length of a sector as described in the prior art. According to the above description, the present invention reads the disk in step S20 only, which is the only reading process corresponding to the disk drive hardware. Therefore, the present invention does not repeatedly turn on and off the disk drive, and the objection is thus achieved.

In practical use, since Windows CE needs to use some configuring information in the previous setting while the system starts up, such as the configuration of network, drivers, desktop, . . . and so on. The configuring information is different with different users or computer devices and may be changeable at any time. Therefore, an additional storage device such as a disk drive is needed to store the configuring information. In the present embodiment, the configuring information is moved from the disk to the free memory space in advance, so as to avoid the drawback of repeatedly turning on and off the disk drive, and the objection is thus achieved.

According to the above description, the advantages of the present invention are:

1. The system speed is increased for not intermittently restarting the disk drive motor.

2. The disk drive motor is driven in a continuous reading step. Therefore, the noise is reduced, the power consumption is lowered, and the disk drive lifetime is extended.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of reading data on a disk drive of a computer with an operating system which does not support a disk drive, consisting of the steps of:

allocating a free memory space in a memory of the computer;

reading data in a plurality of sectors of the disk drive and saving the data in the free memory space with a reading routine;

receiving a disk drive reading command; and processing data in the allocated free memory space saving the data of the disk drive according to the disk drive reading command.

2. The method according to claim 1, wherein the disk drive comprises a floppy disk drive with a floppy disk therein.

3. The method according to claim 2, wherein said reading step saves data in all the sectors of the floppy disk into the free memory space, and the free memory space is larger than all data in the floppy disk.

4. The method according to claim 1, wherein the method is executed before the booting process.

5. The method according to claim 1, wherein the disk drive comprises a hard disk drive.

6. The method according to claim 1, wherein the data comprises booting parameters.

7. A method of reading data on a disk drive of a computer which does not support a disk drive, consisting of the steps of:

allocating a free memory space in a memory of the computer;

reading data in a plurality of sectors of the disk drive and saving the data in the free memory space with a reading routine;

receiving a disk drive reading command; and processing data, in response to a data processing length parameter, in the allocated free memory space saving the data of the disk drive according to the disk drive reading command and the data processing length parameter.

8. The method according to claim 7, wherein a length corresponding to the data processing length parameter in bytes is smaller than that of a sector.

9. The method according to claim 7, wherein said to disk drive comprises a floppy disk drive with a floppy disk therein.

10. The method according to claim 9, wherein the reading step saves all data of the floppy disk into the free memory space, wherein the free memory space is larger than all data in the floppy disk.

11. The method according to claim 7, wherein the method is executed before the booting process.

12. The method according to claim 7, wherein said disk drive comprises a hard disk drive.

13. The method according to claim 7, wherein the data comprises booting parameters.

* * * * *